US007617040B2

(12) United States Patent
Miyashita

(10) Patent No.: US 7,617,040 B2
(45) Date of Patent: Nov. 10, 2009

(54) IGNITION APPARATUS FOR INTERNAL COMBUSTION ENGINE

(75) Inventor: Shigeki Miyashita, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/664,157

(22) PCT Filed: Oct. 10, 2006

(86) PCT No.: PCT/JP2006/020218

§ 371 (c)(1),
(2), (4) Date: Mar. 29, 2007

(87) PCT Pub. No.: WO2007/046270

PCT Pub. Date: Apr. 26, 2007

(65) Prior Publication Data

US 2009/0199816 A1 Aug. 13, 2009

(30) Foreign Application Priority Data

Oct. 17, 2005 (JP) ............................ 2005-302243

(51) Int. Cl.
*G06F 19/00* (2006.01)
*F02P 19/02* (2006.01)
*F02P 15/08* (2006.01)
*G01M 19/00* (2006.01)

(52) U.S. Cl. .................... 701/114; 73/144.77; 324/399; 123/406.14; 123/638

(58) Field of Classification Search ............ 123/406.14, 123/630, 636–638; 701/101, 102, 114, 115; 73/114.62, 114.67, 114.77; 324/378, 380, 324/384, 399
See application file for complete search history.

(56) References Cited

U.S. PATENT DOCUMENTS

| | | | | |
|---|---|---|---|---|
| 4,558,280 | A * | 12/1985 | Koehl et al. | 701/101 |
| 5,493,496 | A * | 2/1996 | James et al. | 701/102 |
| 5,941,208 | A * | 8/1999 | Biemelt et al. | 123/298 |
| 6,211,680 | B1 * | 4/2001 | Hohner et al. | 73/114.67 |
| 6,359,439 | B1 * | 3/2002 | Crecelius et al. | 701/115 |
| 6,922,057 | B2 * | 7/2005 | Zhu et al. | 324/382 |
| 7,134,423 | B2 * | 11/2006 | Zhu et al. | 123/406.14 |
| 7,213,573 | B2 * | 5/2007 | Daniels et al. | 123/406.14 |

FOREIGN PATENT DOCUMENTS

| | | | |
|---|---|---|---|
| JP | 58-192970 | 11/1983 | |
| JP | 63-205460 | 8/1988 | |
| JP | 3-286186 | 12/1991 | |
| JP | 8-128381 | 5/1996 | |
| JP | 10160647 A * | 6/1998 | 701/114 |
| JP | 2002-266739 | 9/2002 | |

* cited by examiner

*Primary Examiner*—Willis R Wolfe, Jr.
(74) *Attorney, Agent, or Firm*—Finnegan, Henderson, Farabow, Garrett & Dunner, LLP

(57) ABSTRACT

An ignition apparatus which allows for an accurate diagnosis of a spark plug in an internal combustion engine provided with plural spark plugs for each cylinder is provided for an internal combustion engine. The ignition apparatus is for an internal combustion engine provided with plural spark plugs for each cylinder, and includes an input port which receives fail signals S3 and S4 generated corresponding to each of the plural spark plugs for diagnosis of the spark plugs. An input timing of the fail signal to the input port is made different for each of the plural fail signals. Ignition timings S1, S2 of the plural spark plugs are set to different times.

9 Claims, 3 Drawing Sheets

IGNITION APPARATUS FOR INTERNAL COMBUSTION ENGINE

TECHNICAL FIELD

The present invention relates to an ignition apparatus for an internal combustion engine.

BACKGROUND ART

Japanese Patent Application Laid-Open No. S63-205460 (Patent Document 1) describes that, in an internal combustion engine which includes plural cylinders each provided with one spark plug for an ignition thereof, an ignition control signal (ignition signal) is output at different timing for each spark plug of the cylinder so that the ignition control signals of the respective spark plugs of the cylinders do not overlap with each other.

Japanese Patent Application Laid-Open No. H08-128381 (Patent Document 2) discloses an ignition apparatus for an internal combustion engine, wherein the ignition apparatus outputs an ignition signal from an ECU to an igniter, and detects an ignition state based on a fail signal returned from the igniter. In the above ignition apparatus, a single signal line is employed as both a signal line for the ignition signal and a signal line for the fail signal; and when the fail signal overlaps with the ignition signal, the level of the fail signal is lowered relative to the level of the ignition signal.

Patent Document 1: Japanese Patent Application Laid-Open No. S63-205460

Patent Document 2: Japanese Patent Application Laid-Open No. H08-128381

DISCLOSURE OF INVENTION

Problem to be Solved by the Invention

In a conventional internal combustion engine provided with a single spark plug for each cylinder and a single, shared IGF port (IGF detection device) for all cylinders for failure detection, an output timing of the ignition signal is made different for each spark plug of the cylinder so that the ignition signals for different spark plugs of the cylinders do not overlap with each other. Thus, the returning fail signals corresponding to the respective ignition signals do not overlap with each other on entering the IGF port in the ignition apparatus, whereby an accurate diagnosis can be made for each spark plug with the single IGF port.

When the internal combustion engine is provided with plural spark plugs for each cylinder, however, plural spark plugs corresponding to one cylinder may be ignited simultaneously, resulting in concurrent return of the fail signals; then, at an occurrence of malfunction, a single IGF port is not sufficient to identify the spark plug which causes the malfunction. It is possible to provide plural IGF ports for failure detection in the internal combustion engine provided with plural spark plugs for each cylinder so that each ignition device can be checked for proper ignition. Such an arrangement, however, increases required costs and spaces.

The technique disclosed in Patent Document 1 does not presuppose application in a multi-spark plugs ignition apparatus provided with plural spark plugs controlled to be ignited simultaneously. When the technique of Patent Document 1 is applied to a multi-spark plugs ignition apparatus, in which the number of IGF ports for failure detection is smaller than the number of spark plugs (for example, a system having only one IGF port), if the ignition signals are output simultaneously, plural fail signals overlap with each other on entering the IGF port, whereby the diagnosis of coils and spark plugs may not be made accurately.

An object of the present invention is to provide an ignition apparatus for an internal combustion engine provided with plural spark plugs for each cylinder, wherein an accurate diagnosis of the spark plugs can be realized.

Means for Solving Problem

An ignition apparatus for an internal combustion engine according to one aspect of the present invention is an ignition apparatus for an internal combustion engine provided with plural spark plugs for each cylinder, and the ignition apparatus includes an input port that receives a fail signal generated corresponding to each of the plural spark plugs for a diagnosis of the spark plugs, wherein an input timing to the input port is set differently timewise for each of the plural fail signals.

In the ignition apparatus for the internal combustion engine according to another aspect of the present invention, an ignition timing may be set differently timewise for each of the plural spark plugs.

In the ignition apparatus for the internal combustion engine according to still another aspect of the present invention, a time elapsed after an ignition timing of the spark plug until an input of the fail signal corresponding to the spark plug into the input port may be made different timewise for each of the plural spark plugs.

In the ignition apparatus for the internal combustion engine according to still another aspect of the present invention, the ignition timing of the spark plug for which the time is long may be set later than the ignition timing of the spark plug for which the time is short.

In the ignition apparatus for the internal combustion engine according to still another aspect of the present invention, a delay element or a delay circuit may be provided in a signal line which conveys part of the plural fail signals up to the input port.

Effect of the Invention

According to the present invention, an accurate diagnosis of spark plugs can be made for an internal combustion engine that is provided with plural spark plugs for each cylinder.

EXPLANATIONS OF LETTERS OR NUMERALS

10 Engine
11 First Cylinder
12 Second Cylinder
13 Third Cylinder
14 Fourth Cylinder
21 Spark Plug
22 Spark Plug
23 Spark Plug
24 Spark Plug
25 Spark Plug
26 Spark Plug
27 Spark Plug
28 Spark Plug
31 Ignition Coil
32 Ignition Coil
33 Ignition Coil
34 Ignition Coil
35 Ignition Coil
36 Ignition Coil
37 Ignition Coil
38 Ignition Coil
40 ECU
41 Ignition-Signal Output Port IGT1A
42 Ignition-Signal Output Port IGT1B
43 Ignition-Signal Output Port IGT2A
44 Ignition-Signal Output Port IGT2B
45 Ignition-Signal Output Port IGT3A
46 Ignition-Signal Output Port IGT3B
47 Ignition-Signal Output Port IGT4A
48 Ignition-Signal Output Port IGT4B
49 IGF Port
50 Fail-Signal Line
51 First Fail-Signal Line
52 Second Fail-Signal Line
60 Delay Circuit
61 Inverter
62 Inverter
63 Capacitor
S1 Ignition Signal
S2 Ignition Signal
S3 Fail Signal
S4 Fail Signal

BEST MODE(S) FOR CARRYING OUT THE INVENTION

Exemplary embodiments of the present invention will be described in detail below with reference to the accompanying drawings.

FIRST EMBODIMENT

Figure 1:
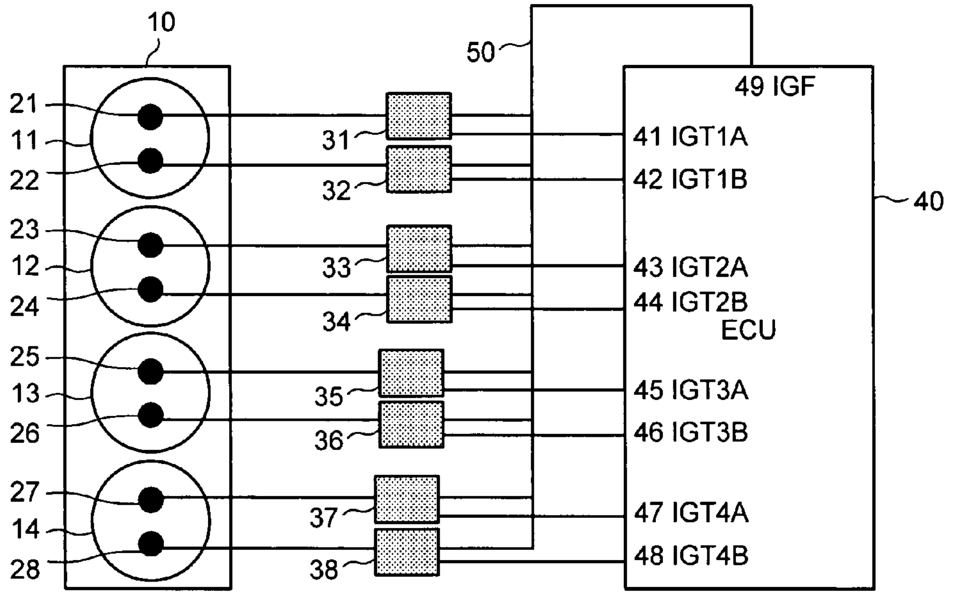
FIG. 1 is a schematic configuration diagram of an ignition apparatus for an internal combustion engine according to a first embodiment of the present invention.

An ignition apparatus for an internal combustion engine according to a first embodiment will be described with reference to FIGS. 1 and 2. As shown in FIG. 1, a four-cylinder engine 10 includes cylinders each having two spark plugs among spark plugs 21 to 28. Specifically, a first cylinder 11 is provided with two spark plugs 21 and 22; and similarly, a second cylinder 12 is provided with two spark plugs 23 and 24; a third cylinder 13 is provided with two spark plugs 25 and 26; and a fourth cylinder 14 is provided with two spark plugs 27 and 28.

The spark plugs 21 to 28 are connected to secondary coils of ignition coils 31 to 38, respectively. Primary coils of the ignition coils 31 to 38 are connected to ignition-signal output ports IGT1A 41 to IGT4B 48, respectively, of an ECU 40. When the ignition signals (electric currents) are supplied from the ignition-signal output ports IGT1A 41 to IGT4B 48 to the primary coils of the ignition coils 31 to 38, high voltage is generated in the secondary coils of the ignition coils 31 to 38, and the spark plugs 21 to 28 are ignited. The fail signal is supplied to a single failure-detecting IGF port 49 of the ECU 40 via a shared fail-signal line 50 in the ignition apparatus.

In the first embodiment, the fail signal is generated on a trailing edge of the ignition signal in each ignition device. Therefore, when the plural spark plugs 21 to 28 are to be ignited in the first embodiment, different output timings are set for the ignition signals, so that the ignition occurs at different times. Thus, the fail signals corresponding to the plural spark plugs 21 to 28 are prevented from overlapping with each other on entering the single IGF port 49.

Figure 2:
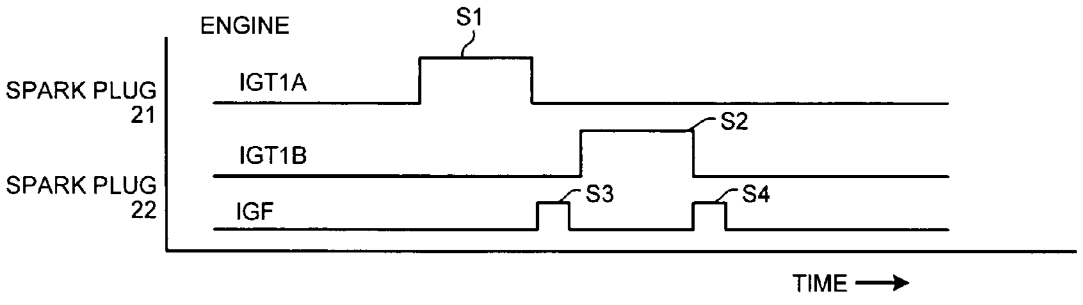
FIG. 2 is a waveform chart of ignition signals and fail signals in the ignition apparatus for the internal combustion engine according to the first embodiment of the present invention.

Specifically, as shown in FIG. 2, there is a phase difference between an output of an ignition signal S1 which is supplied from the ignition-signal output port IGT1A to the spark plug 21 and an output of an ignition signal S2 which is supplied from the ignition-signal output port IGT1B to the spark plug 22. Therefore, a fail signal S3 generated on a trailing edge of the ignition signal S1 corresponding to the spark plug 21 enters the IGF port 49 at different timing from the entrance of a fail signal S4 generated on a trailing edge of the ignition signal S2 corresponding to the spark plug 22 to the IGF port 49.

Thus, even when fail signals corresponding respectively to the plural spark plugs 21 to 28 are supplied to the single IGF port 49 via the single fail-signal line 50, each fail signal always enters the IGF port 49 at a different time from the entrance of the other fail signals into the IGF port 49. Therefore, when a malfunction of the ignition device (including the coil and the spark plug) is detected, it can be accurately distinguished whether the malfunction occurs in the ignition device including the spark plug 21 and the coil 31 or in the ignition device including the spark plug 22 and the coil 32.

SECOND EMBODIMENT

Next, a second embodiment will be described with reference to FIGS. 3 to 5.

In the second embodiment, the description of elements common to those of the first embodiment will not be repeated and elements different from those of the first embodiment alone will be described.

Figure 3:
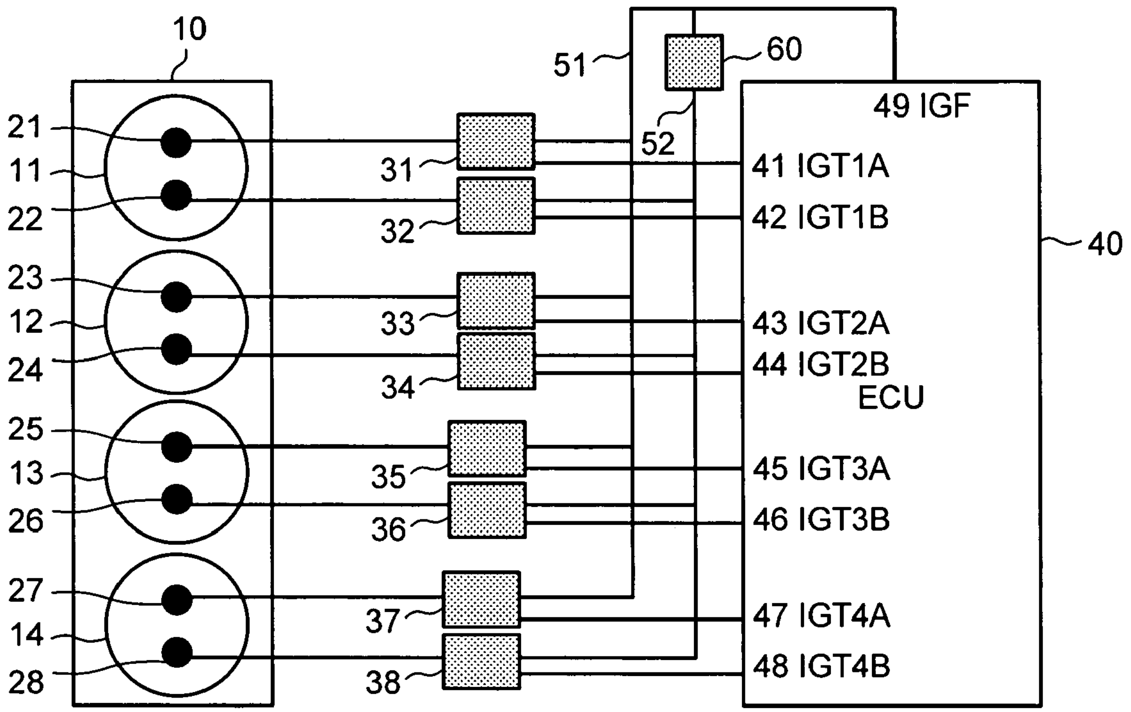
FIG. 3 is a schematic configuration diagram of an ignition apparatus for an internal combustion engine according to a second embodiment of the present invention.

As shown in FIG. 3, fail signals corresponding to the first spark plugs 21, 23, 25, and 27 of the respective cylinders are supplied into the failure-detecting IGF port 49 of the ECU 40 via a first fail-signal line 51, whereas fail signals corresponding to the second spark plugs 22, 24, 26, and 28 of the respective cylinders are supplied into the failure-detecting IGF port 49 via a second fail-signal line 52. A delay circuit 60 is connected to the second fail-signal line 52.

Figure 4:
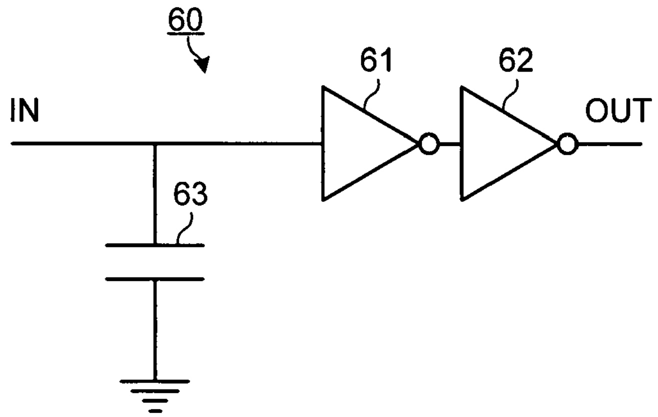
FIG. 4 is diagram of a detailed configuration of a delay circuit in the ignition apparatus for the internal combustion engine according to the second embodiment of the present invention.

As shown in FIG. 4, the delay circuit 60 includes two inverters 61 and 62 connected in series and a grounded capacitor 63 connected at an input side of the inverter 61. A signal is delayed while passing through the two inverters 61 and 62 connected in series.

Similarly to the first embodiment, the fail signal is generated on a trailing edge of the ignition signal commonly for all the ignition devices according to the second embodiment. The fail signal passing through the second fail-signal line 52 and the delay circuit 60, however, is input to the IGF port 49 at a delayed timing from the input of the fail signal passing through the first fail-signal line 51. When the plural spark plugs 21 to 28 are to be ignited in the second embodiment, the ignition signals may be output at the same timing so as to make a concurrent ignition.

Figure 5:
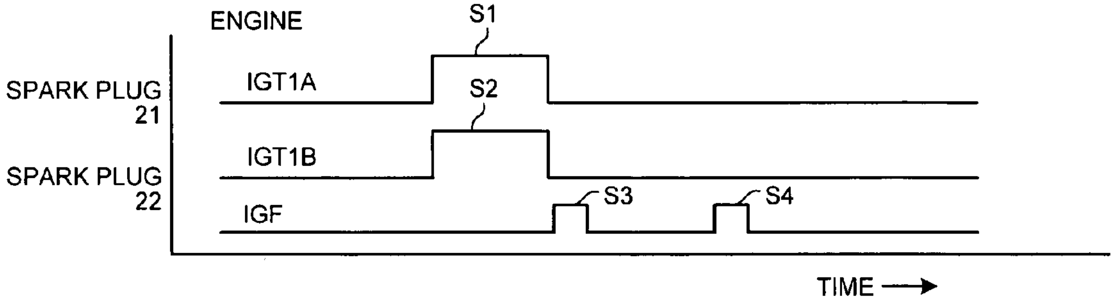
FIG. 5 is a waveform chart of ignition signals and fail signals in the ignition apparatus for the internal combustion engine according to the second embodiment of the present invention.

Specifically, as shown in FIG. 5, an output of the ignition signal S1 supplied from the ignition-signal output port IGT1A to the spark plug 21 and an output of the ignition signal S2 supplied from the ignition-signal output port IGT1B to the spark plug 22 are simultaneous. Thus, the fail signal S3 generated on the trailing edge of the ignition signal S1 corresponding to the spark plug 21 and the fail signal S4 generated on the trailing edge of the ignition signal S2 corresponding to the spark plug 22 are generated in the same time period. However, the input of the fail signal S4 into the IGF port 49 lags behind the input of the fail signal S3 by a delay time set by the delay circuit 60.

As can be seen from above, since the fail signals S3 and S4 always enter the IGF port 49 at different timings, it is possible, when the malfunction is detected in an ignition device (including the coil and the spark plug), to accurately distinguish whether a malfunction occurs in the ignition device including the spark plug 21 and the coil 31 or in the ignition device including the spark plug 22 and the coil 32.

In the second embodiment, a position where the delay circuit 60 is arranged is not limited to the position shown in FIG. 3. In the configuration as shown in FIG. 3, the fail signals corresponding to the respective first spark plugs 21, 23, 25, and 27 of the cylinders pass through the first fail-signal line 51, the fail signals corresponding to the respective second spark plugs 22, 24, 26, and 28 of the cylinder pass through the second fail-signal line 52, and the delay circuit 60 is connected to the second fail-signal line 52. If the ignition signals are output to the first spark plugs 21, 23, 25, and 27 of the plural cylinders simultaneously, signal transmission time is same for all the signals; and hence, the corresponding fail signals enter the IGF port 49 simultaneously. Therefore, it is difficult to accurately identify the ignition device which causes the malfunction. Similarly, if the ignition signals are output to the second spark plugs 22, 24, 26, and 28 of the plural cylinders simultaneously, signal transmission time is same for all the signals; and hence, the corresponding fail signals enter the IGF port 49 simultaneously. And therefore, it is difficult to accurately identify the ignition device which causes the malfunction. To deal with the above inconveniences, it is necessary to arrange a delay circuit in a signal line for each of the fail signals corresponding respectively to the plural spark plugs 21 to 28, to which the ignition signals may be supplied simultaneously, so that the signal transmission time is different on each signal line.

THIRD EMBODIMENT

Next, a third embodiment will be described.

The third embodiment relates to the second embodiment described above.

In the following, a circuit configuration having the same configuration as the configuration according to the second embodiment shown in FIG. 3 will be described as an example of the third embodiment. In the second embodiment, the spark plug 21 and the spark plug 22 are ignited simultaneously, whereas in the third embodiment, the spark plug 21 and the spark plug 22 are ignited at different times. When the spark plug 21 and the spark plug 22 are ignited at different times, the ignition of the spark plug 22, which is connected to a fail-signal transmission path in which the delay circuit 60 is connected, lags behind the ignition of the spark plug 21.

Figure 6:
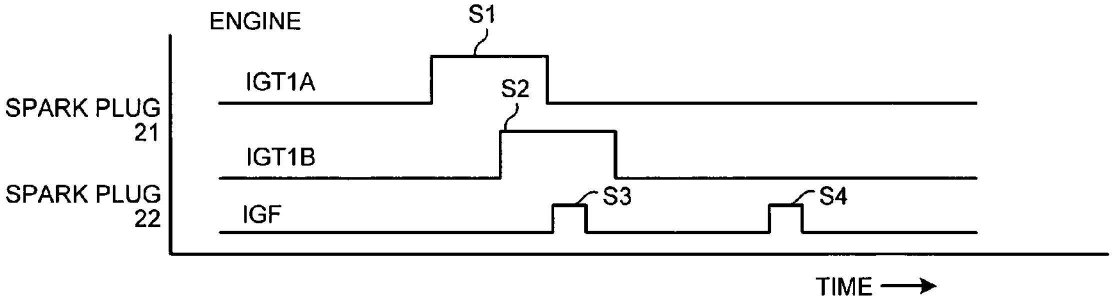
FIG. 6 is a waveform chart of ignition signals and fail signals in an ignition apparatus for an internal combustion engine according to a third embodiment of the present invention.

Specifically, as shown in FIG. 6, the output of the ignition signal S2 from the ignition-signal output port IGT1B to the spark plug 22 lags behind the output of the ignition signal S1 from the ignition-signal output port IGT1A to the spark plug 21. Accordingly, the generation of the fail signal S4 on a trailing edge of the ignition signal S2 corresponding to the spark plug 22 lags behind the generation of the fail signal S3 on a trailing edge of the ignition signal S1 corresponding to the spark plug 21. Further, since the fail signal S4 further lags behind the fail signal S3 while passing through the delay circuit 60, the time difference between the input of the fail signal S3 and the input of the fail signal S4 into the IGF port 49 increases in comparison with that in the second embodiment (in which the ignition signals S1 and S2 are output simultaneously).

Thus, the fail signals S3 and S4 are always supplied to the IGF port 49 at different times, whereby when malfunction is detected in the ignition device (including the coil and the spark plug), it can be accurately distinguished whether the malfunction occurs in the ignition device including the spark plug 21 and the coil 31, or in the ignition device including the spark plug 22 and the coil 32.

On the contrary, if the ignition of the spark plug 21 lags behind the ignition of the spark plug 22, the difference in the ignition timing may be offset by the delay time generated in the delay circuit 60, and the difference in the input timing of the fail signal S3 and the fail signal S4 to the IGF port 49 may be eliminated. Even when the difference is not eliminated, it may become less. When there is only a slight difference in the input timing, the fail signals S3 and S4 are detected at a short interval, and the failure detection needs to be performed at a short time interval, which necessitates increased accuracy of detection circuit. In view of the above, the output of the ignition signal S2 is made to lag behind the output of the ignition signal S1 in the third embodiment.

As can be seen from the second and the third embodiment, when the configuration shown in FIG. 3 is adopted, the ignition timing can be changed flexibly for the spark plugs 21 and 22 of the same cylinder according to circumstances. Specifically, no matter whether the spark plugs 21 and 22 are ignited simultaneously (second embodiment) or the spark plugs 21 and 22 are ignited at different times (third embodiment), the fail signals S3 and S4 enter the IGF port 49 at different times, whereby the diagnosis of the coils 31 and 32, and the spark plugs 21 and 22 can be made accurately.

Further, in the configuration without the delay circuit 60 as in the first embodiment, a substantially simultaneous ignition of the spark plugs 21 and 22 can be realized when the phase difference between the ignition timings of the spark plugs 21 and 22 is set small. Even if there is only a small phase difference between the ignition times of the spark plugs 21 and 22, as far as there is a phase difference, a difference between the input times of the fail signals S3 and S4 into the IGF port 49 can be secured, and the fail signals S3 and S4 can be detected separately, whereby the diagnosis of each ignition device can be made accurately.

INDUSTRIAL APPLICABILITY

As can be seen from above, an ignition apparatus for an internal combustion engine according to the present invention is useful when the internal combustion engine is provided with plural spark plugs for each cylinder, and more particularly, is suitable for making an accurate diagnosis of the spark plugs.

The invention claimed is:

1. An ignition apparatus for an internal combustion engine comprising:

plural spark plugs provided for each cylinder;

a control unit that controls to ignite the plural spark plugs;

an input port that receives a fail signal generated corresponding to each of the plural spark plugs for a diagnosis of the spark plugs, wherein an input timing to the input port is set differently timewise for each of the plural fail signals.

2. The ignition apparatus for the internal combustion engine according to claim 1, wherein an ignition timing is set differently timewise for each of the plural spark plugs.

3. The ignition apparatus for the internal combustion engine according to claim 2, wherein a substantially simultaneous ignition of the plural spark plugs in each of the cylinder is performed when a difference between the ignition timings of the plural spark plugs is set small.

4. The ignition apparatus for the internal combustion engine according to claim 1, wherein a time elapsed after an ignition timing of the spark plug until an input of the fail signal corresponding to the spark plug into the input port is made different timewise for each of the plural spark plugs.

5. The ignition apparatus for the internal combustion engine according to claim 4, wherein a delay element or a delay circuit is provided in a signal line which conveys part of the plural fail signals up to the input port.

6. The ignition apparatus for the internal combustion engine according to claim 5, wherein the delay circuit includes at least two inverters connected in series.

7. The ignition apparatus for the internal combustion engine according to claim 4, wherein the ignition timing of the spark plug for which the time is long is set later than the ignition timing of the spark plug for which the time is short.

8. The ignition apparatus for the internal combustion engine according to claim 7, wherein a delay element or a delay circuit is provided in a signal line which conveys part of the plural fail signals up to the input port.

9. The ignition apparatus for the internal combustion engine according to claim 8, wherein the delay circuit includes at least two inverters connected in series.

* * * * *

UNITED STATES PATENT AND TRADEMARK OFFICE

CERTIFICATE OF CORRECTION

PATENT NO. : 7,617,040 B2
APPLICATION NO. : 11/664157
DATED : November 10, 2009
INVENTOR(S) : Shigeki Miyashita It is certified that error appears in the above-identified patent and that said Letters Patent is hereby corrected as shown below:

On the Title Pg, Item (86), "PCT/JP2006/020218" should read
--PCT/JP2006/320218--

Signed and Sealed this

First Day of June, 2010

David J. Kappos
*Director of the United States Patent and Trademark Office*